(12) United States Patent
Sharifi

(10) Patent No.: US 11,038,824 B2
(45) Date of Patent: Jun. 15, 2021

(54) INLINE RESPONSES TO VIDEO OR VOICE MESSAGES

(71) Applicant: Google LLC, Mountain View, CA (US)

(72) Inventor: Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 123 days.

(21) Appl. No.: 16/130,650

(22) Filed: Sep. 13, 2018

(65) Prior Publication Data
US 2020/0092237 A1 Mar. 19, 2020

(51) Int. Cl.
H04L 12/58 (2006.01)
G06F 16/738 (2019.01)
G06F 3/16 (2006.01)
G10L 15/18 (2013.01)
G10L 25/93 (2013.01)
H04N 21/4788 (2011.01)

(52) U.S. Cl.
CPC ............. H04L 51/10 (2013.01); G06F 3/167 (2013.01); G06F 16/739 (2019.01); G10L 15/1815 (2013.01); G10L 25/93 (2013.01); H04L 51/043 (2013.01); H04N 21/4788 (2013.01)

(58) Field of Classification Search
CPC ..... H04L 51/10; H04L 51/043; G06F 16/739; G06F 3/167; G10L 15/1815; G10L 25/93; H04N 21/4788; H04N 21/8456; H04N 21/4334; H04N 21/278; H04N 21/41407; H04N 21/42203; H04N 21/4394; H04N 21/47217; H04N 21/8455
See application file for complete search history.

(56) References Cited

U.S. PATENT DOCUMENTS

| 5,732,216 | A | 3/1998 | Logan et al. |
| 8,843,372 | B1* | 9/2014 | Isenberg ................. G10L 25/48 704/250 |
| 8,886,011 | B2* | 11/2014 | Chou ................... H04N 9/8227 386/246 |
| 9,485,542 | B2 | 11/2016 | Girish et al. |
| 10,394,804 | B1* | 8/2019 | Podgorny ............ G06F 16/958 |
| 2010/0017474 | A1 | 1/2010 | Kandekar et al. |

(Continued)

FOREIGN PATENT DOCUMENTS

| EP | 1117242 | 7/2001 |
| WO | 2017157428 | 9/2017 |

OTHER PUBLICATIONS

EPO, International Search Report for International Patent Application No. PCT/US2019/034723, dated Jul. 30, 2019, 5 pages.

(Continued)

Primary Examiner — Philip C Lee
(74) Attorney, Agent, or Firm — IP Spring

(57) ABSTRACT

The method includes receiving sender media that was recorded by a sender device associated with a sender. The method further comprises playing, by a recipient device, the sender media for a recipient. The method further comprises detecting that the recipient is speaking. The method further comprises recording recipient media based on detecting that the recipient is speaking. The method further comprises determining a location in the sender media at which the recipient media is to be included. The method further comprises generating combined media that includes at least a portion of the sender media and the recipient media at the location.

20 Claims, 6 Drawing Sheets

(56) References Cited

U.S. PATENT DOCUMENTS

| | | | |
|---|---|---|---|
| 2013/0006633 A1* | 1/2013 | Grokop | G10L 15/063 |
| | | | 704/245 |
| 2017/0169816 A1* | 6/2017 | Blandin | G10L 15/08 |
| 2017/0270919 A1* | 9/2017 | Parthasarathi | G10L 15/02 |
| 2020/0034492 A1* | 1/2020 | Verbeke | G06F 40/40 |

OTHER PUBLICATIONS

EPO, Written Opinion for International Patent Application No. PCT/US2019/034723, dated Jul. 30, 2019, 8 pages.

Furui, "Recent Advances in Automatic Speech Summarization", Proc. IEEE Workshop Spoken Language Technology, Dec. 10, 2006, pp. 16-21, (https://ieeexplore.ieee.org/abstract/document/4123351).

WIPO, International Preliminary Report on Patentability for International Patent Application No. PCT/US2019/034723, dated Mar. 9, 2021, 9 pages.

* cited by examiner

INLINE RESPONSES TO VIDEO OR VOICE MESSAGES

BACKGROUND

The specification relates to a media application that generates combined media that includes both sender media and recipient media.

As mobile phones and other portable communication devices become more popular, a sender may leave a video message or an audio message for a recipient. Technology exists for the recipient to respond to questions within the message. For example, technology exists that allows the recipient to manually click on a portion of the message where they want to add a response. However, the manual technique for adding a response is arduous enough that the recipient may decide to abandon use of the technology. In addition, adding a response to an already long message may make it so long that the sender has no desire to listen to the message.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

Embodiments generally relate to a method comprising receiving sender media that was recorded by a sender device associated with a sender. The method further comprises playing, by a recipient device, the sender media for a recipient. The method further comprises detecting that the recipient is speaking. The method further comprises recording recipient media based on detecting that the recipient is speaking. The method further comprises determining a location in the sender media at which the recipient media is to be included. The method further comprises generating combined media that includes at least a portion of the sender media and the recipient media at the location.

In some embodiments, the method further includes determining a context of the sender media in relation to the recipient media that includes a question being asked by the sender at the location in the sender media at which the recipient media is to be included and a subset of the sender media that is within proximity to the question and summarizing the sender media based on the context, where the at least the portion of the sender media is summarized based on the context. In some embodiments, the question that is part of the context of the sender media is determined by detecting a pause or a semantic break in the sender media. In some embodiments, a machine learning model trained to detect the pause or the semantic break determines the context by detecting the pause or the semantic break in the sender media. In some embodiments, the sender media is summarized based on the context as a text transcription. In some embodiments, a machine learning model trained to analyze audio to detect questions in the audio determines the context of the sender media. In some embodiments, the sender media is generated by adding a pause after the location in the sender media at which the recipient media is to be included and the at least the portion of the sender media starts after the pause. In some embodiments, detecting that the recipient is speaking comprises detecting a start point of a speech signal with a microphone of the recipient device. In some embodiments, the method further includes generating a user interface operable for playback of the combined media, the user interface including a seek bar that facilitates selection of different playback locations within the combined media and an identifier that identifies the location of the recipient media in the combined media. In some embodiments, the sender media is a video file or an audio file.

In some embodiments, a system comprises one or more processors and a memory with instructions stored thereon that, when executed by the one or more processors, cause the one or more processors to perform operations comprising receiving a sender video that includes first audio that was recorded by a sender device associated with a sender, playing the sender video for a set of recipients, detecting when each recipient of the set of recipients is speaking, recording recipient media based on the set of recipients speaking in response to the sender video, and generating a combined media that includes (1) at least a portion of the sender video and (2) the recipient media.

In some embodiments, wherein the memory has further instructions stored thereon that cause the one or more processors to perform operations comprising determining a subject matter associated with portions of the combined video where at least one recipient from the set of recipients spoke and generating a user interface that includes a seek bar based on the combined media that illustrates (1) a location within the combined media where the set of recipients responded to the sender; (2) a number of recipients of the set of recipients that spoke at the location; and (3) the subject matter associated with the portions of the sender video. In some embodiments, wherein the memory has further instructions stored thereon that cause the one or more processors to perform operations comprising determining a context of the sender media in relation to the recipient media that includes a question being asked by the sender at the location in the sender media at which the recipient media is to be included and a subset of the sender media that is within proximity to the question and summarizing the sender media based on the context, where the at least the portion of the sender media is summarized based on the context.

In some embodiments, a non-transitory computer readable medium includes instructions stored thereon that, when executed by one or more computers, cause the one or more computers to perform operations, the operations comprising: receiving sender media that was recorded by a sender device associated with a sender, playing, by a recipient device, the sender media for a recipient, detecting that the recipient is speaking, recording recipient media based on detecting that the recipient is speaking, determining a location in the sender media at which the recipient media is to be included, and generating combined media that includes at least a portion of the sender media and the recipient media at the location.

In some embodiments, the operations further comprise determining a context of the sender media in relation to the recipient media that includes a question being asked by the sender at the location in the sender media at which the recipient media is to be included and a subset of the sender media that is within proximity to the question and summarizing the sender media based on the context, where the at least the portion of the sender media is summarized based on the context. In some embodiments, the question that is part of the context of the sender media is determined by detecting a pause or a semantic break in the sender media. In some embodiments, a machine learning model trained to detect the pause or the semantic break determines the context by detecting the pause or the semantic break in the sender media. In some embodiments, the sender media is summarized based on the context as a text transcription. In some embodiments, a machine learning model trained to analyze audio to detect questions in the audio determines the context of the sender media. In some embodiments, the sender media is generated by adding a pause after the location in the sender media at which the recipient media is to be included and the at least the portion of the sender media starts after the pause.

The various embodiments described below advantageously describe a way to generate combined media that includes (1) at least a portion of sender media and (2) recipient media at a location in the sender media at which the recipient media is meant to be included. As a result, the combined media may include both questions from a sender and answers from a recipient. In some embodiments, a receiver may listen to the sender media and the playback may be paused when it is detected that the recipient is speaking. In some embodiments, a context of the sender media may be determined, and a summary of the sender media may be generated so that the combined media includes just the part of the sender media that are needed to determine a question and the context of the question. As a result, the combined media may include efficiently summarized portions of the sender media and the recipient media.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

In some embodiments, a method includes receiving sender media that was recorded by a sender device associated with a sender. For example, the sender may record a video on a mobile device. A recipient may play the sender media on a recipient device. The method may include detecting that the recipient is speaking. In some embodiments, the recipient device may pause the playback of the first media in response to detecting that the recipient is speaking.

The method may include recording recipient media based on detecting that the recipient is speaking and determining a location in the sender media at which the recipient media is to be included. For example, if the sender media includes the following audio: "Hi. How are you? I was thinking about arranging a dinner for next week. Which nights would you be available? I'm considering either Cascal or Tied House. Let me know if you have any preference," the recipient's response may be "I'm free on Tuesday" and "I prefer Cascal." The method may include generating combined media that includes at least a portion of the first media and the recipient media at the location.

In some embodiments, the method may include creating a combined media that includes summarized sender media and recipient media. The method may include determining a context of the sender media in relation to the recipient media that describes a question being asked by the sender at the location in the sender media at which the recipient media is to be included. The method may also include summarizing the recipient media based on the context. The context may include the sentence that includes the question and additional sentences surrounding the question. For example, continuing with the example above, summarizing the sender media based on the context may include reducing the sender media to "Which nights would you be available?" and "I'm considering either Cascal or Tied House. Let me know if you have any preference" and generating the combined media by adding the recipient's responses to the summarized sender media.

Example System

Figure 1:
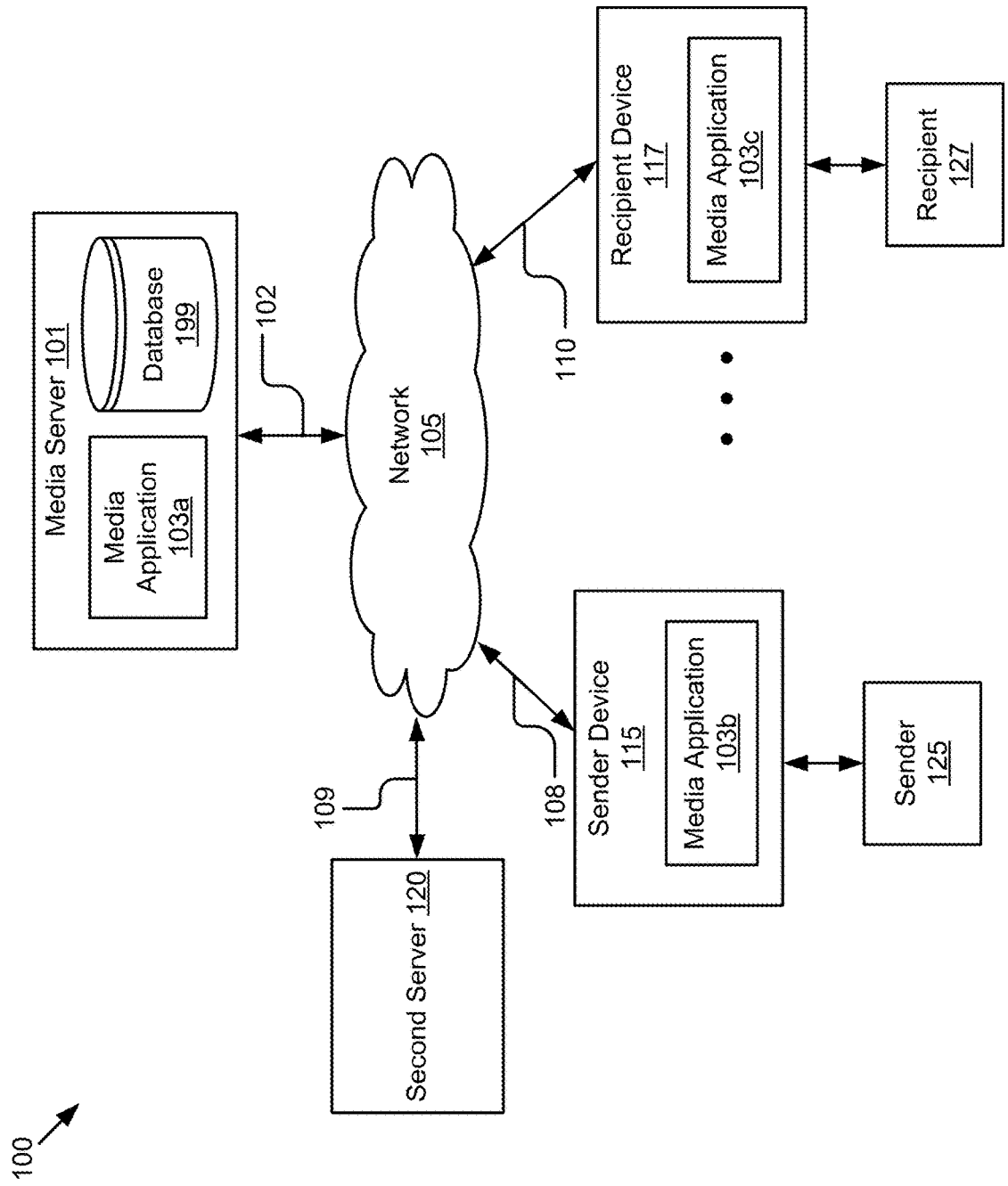
FIG. 1 illustrates a block diagram of an example system that generates combined media according to some embodiments.

FIG. 1 illustrates a block diagram of an example system 100 that generates combined media. The illustrated system 100 includes a media server 101, a sender device 115, a recipient device 117, a second server 120, and a network 105. The sender 125 may be associated with the sender device 115 and recipient 127 may be associated with the recipient device 117. In some embodiments, the system 100 may include other servers or devices not shown in FIG. 1. In FIG. 1 and the remaining figures, a letter after a reference number, e.g., "103a," represents a reference to the element having that particular reference number. A reference number in the text without a following letter, e.g., "103," represents a general reference to embodiments of the element bearing that reference number. Although only one media server 101, one sender device 115, one recipient device 117, one second server 120, and one network 105 are illustrated in FIG. 1, persons of ordinary skill in the art will recognize that FIG. 1 may include one or more media servers 101, one or more sender devices 115, one or more recipient devices 117, one or more second servers 120, and one or more networks 105.

The media server 101 may include a processor, a memory, and network communication capabilities. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from one or more of the sender device 115, the recipient device 117, and the second server 120 via the network 105. The media server 101 may include a media application 103a and a database 199.

The media application 103a may be code and routines operable to route media between the sender device 115 and the recipient device 117. In some embodiments, the media application 103a may also perform analysis of the media. For example, the media application 103a may receive sender media from the sender device 115 (e.g., if a sender 125 leaves a message for a recipient 127) and use machine learning to identify locations in the sender media where the sender 125 was asking a question. the media application 103a may insert a one or two second pause after the question and send the modified sender media to the recipient device 117. In yet another embodiment, sender 125 or recipient 127 may access the media application 103 on the server 101, for example, via a browser and use the media application 103 to record sender media or recipient media.

In some embodiments, the media application 103a may be implemented using hardware including a field-programmable gate array (FPGA) or an application-specific integrated circuit (ASIC). In some embodiments, the media application 103a may be implemented using a combination of hardware and software.

The database 199 may store sender media, recipient media, combined media, media transcriptions, summaries, etc. For example, the database 199 may store video messages, audio messages, images, and/or text. The database 199 may also store social network data associated with the sender 125, the recipient 127, user preferences for the sender 125 and/or the recipient 127, etc.

The sender device 115 may be a computing device that includes a memory and a hardware processor. For example, the sender device 115 may include a desktop computer, a mobile device, a tablet computer, a mobile telephone, a wearable device, a head-mounted display, a mobile email device, a portable game player, a portable music player, a reader device, or another electronic device capable of accessing a network 105.

In the illustrated implementation, the sender device 115 is coupled to the network 105 via signal line 108 and the recipient device 117 is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. The sender device 115 is accessed by a sender 125 and the recipient device 117 is accessed by a recipient 127.

In some embodiments, the sender device 115 can be a user device that is included in a wearable device worn by the sender 125. For example, the sender device 115 is included as part of a clip (e.g., a wristband), part of jewelry, or part of a pair of glasses. In another example, the sender device 115 can be a smart watch. The sender 125 may data associated with the media application 103 on a display of the device worn by the sender 125. For example, the media application 103a may display images, videos, and/or a question about permission associated with a person recognized in an image or a video on a display of a smart watch or a smart wristband.

In some embodiments, media application 103b may be stored on a sender device 115. The media application 103b may be operable to record sender media. The media application 103 may include a thin-client media application 103b stored on the sender device 115 and a media application 103a that is stored on the media server 101. For example, the media application 103b stored on the sender device 115 may record sender media that the sender device 115 sends to the media application 103a on the media server 101 for analyzing.

The recipient device 117 may be a computing device that includes a memory and a hardware processor. For example, the recipient device 117 may include a desktop computer, a mobile device, a tablet computer, a mobile telephone, a wearable device, a head-mounted display, a mobile email device, a portable game player, a portable music player, a reader device, or another electronic device capable of accessing a network 105.

In some embodiments, the recipient device 117 includes a media application 103c. The media application 103c may be operable to receive the sender media either direction from the sender device 115 or via the media server 101. The media application 103c may play the sender media on the recipient device 117 and detect that the recipient 127 is speaking. In response to detecting that the recipient 127 is speaking, the media application 103c may record the recipient media.

The media application 103c may determine a location in the sender media at which the recipient media is to be included. For example, the sender media may include the sender asking "Are you free on Tuesday night?" The media application 103c may determine that the recipient media, which states "Yes!" should be inserted directly after the sender's question. The media application 103c may generate combined media that includes at least a portion of the sender media and the recipient media at the location. For example, the combined media may include all of the sender media with the recipient media inserted directly after the question "Are you free on Tuesday night?" Alternatively, the combined media may include the portion of the sender media with the question "Are you free on Tuesday night" and the recipient media, which includes the response "Yes." Persons of ordinary skill in the art will recognize that one or more of the previous steps can be performed by the media application 103a on the media server 101.

The second server 120 may include a processor, a memory, and network communication capabilities. The second server 120 may access the network 105 via signal line 109. The second server 120 may provide services to the media server 101, the sender device 115, and/or the recipient device 117. For example, the second server 120 may receive sender media from the sender device 115 or the media server 101 and transcribe the sender media into text. In another example, the second server 120 may provide training data that is used by a machine learning module to perform analysis of sender media, recipient media, and/or combined media.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth® communication networks, WiFi®, wireless local area network (WLAN) computer communication specified by IEEE 902.11, or a cellular communications network for sending and receiving data including via short messaging service (SMS), multimedia messaging service (MMS), hypertext transfer protocol (HTTP), direct data connection, email, etc.

Although FIG. 1 illustrates one network 105 coupled to the user devices 115 and the media server 101, in practice one or more networks 105 may be coupled to these entities.

In situations in which the systems and methods discussed herein may collect or use personal information about users (e.g., user data, information about a user's social network, a user's location, a user's biometric information, a user's activities and/or demographic information, storage and analysis of images or video by the media server 101 or media application 103, etc.), users are provided with opportunities to control whether personal information is collected, whether the personal information is stored, whether the personal information is used, whether the images or videos are analyzed, and how information about the user is collected, stored, and used. That is, the systems and methods discussed herein may collect, store, and/or use user personal information only upon receiving explicit authorization from the relevant users to do so. For example, a user is provided with control over whether programs or features collect user information about that particular user or other users relevant to the program or feature. Each user for which personal informationis to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity information may be treated, e.g., anonymized, so that no personally identifiable information can be determined from a video. As another example, a user's geographic location may be generalized to a larger region so that the user's particular location cannot be determined.

Example Sender Device

Figure 2:
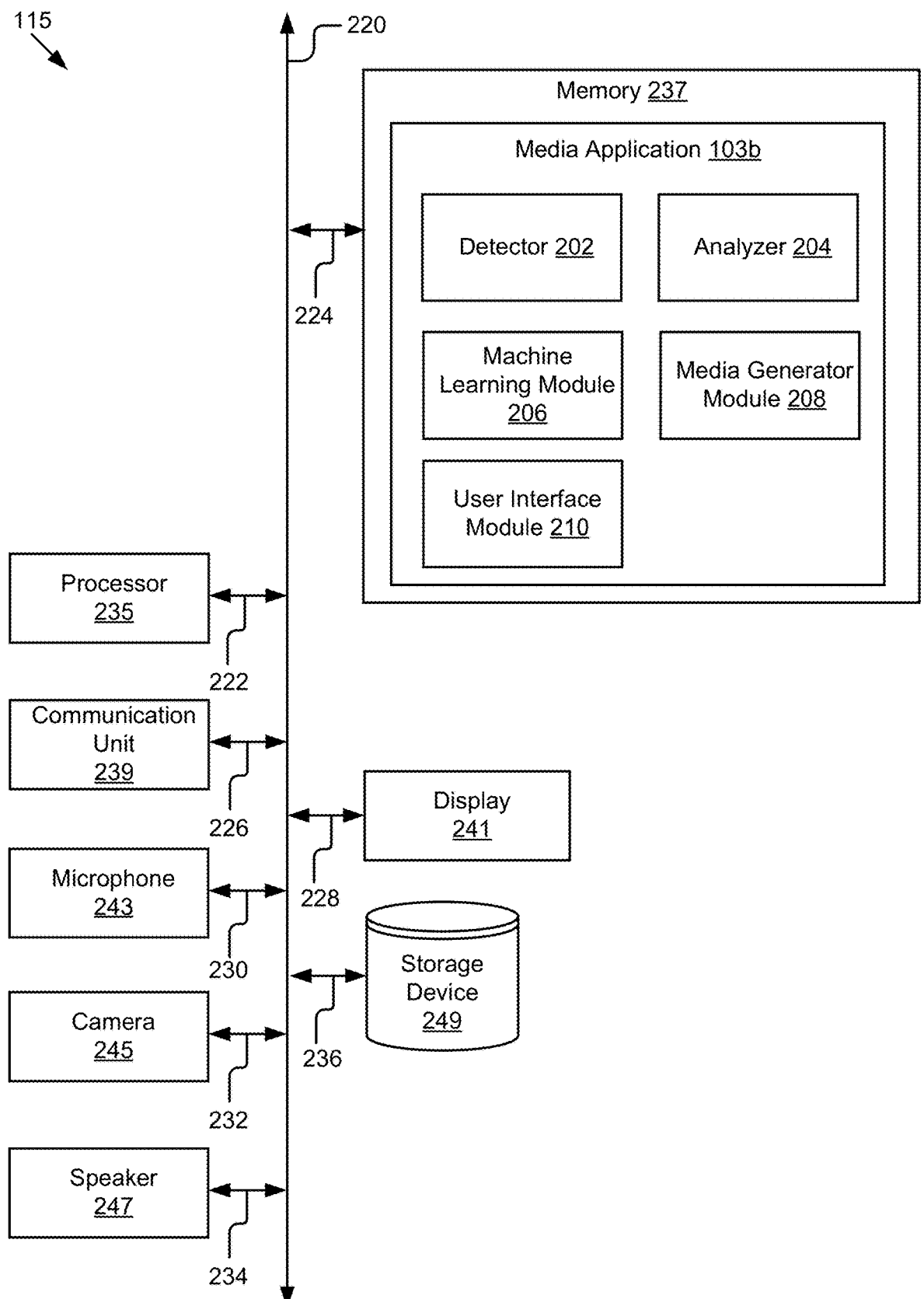
FIG. 2 illustrates a block diagram of an example sender device that generates sender media according to some embodiments.

FIG. 2 illustrates a block diagram of an example sender device 115 that generates sender media according to some embodiments. Although FIG. 2 is illustrated as being a sender device 115, some or all of the functions may be performed by the media server 101 and/or the recipient device 117. The sender device 115 may include a processor 235, a memory 237, a communication unit 239, a display 241, a microphone 243, a camera 245, a speaker 247, and a storage device 249. Additional components may be present or some of the previous components may be omitted depending on whether the steps are all performed by the sender device 115 or the media server 101. For example, if the media server 101 performs all the steps because the sender is using a browser-based media application 103, the media server 101 may not include the display 241.

The sender device 115 may store the media application 103a in the memory 237. In embodiments where the sender device 115 is a wearable device, the sender device 115 may not include storage device 249. In some embodiments, the sender device 115 may include other components not listed here, such as a battery, etc. The components of the sender device 115 may be communicatively coupled by a bus 220.

The processor 235 includes an arithmetic logic unit, a microprocessor, a general purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the sender device 115. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the media application 103, which is described in greater detail below. The memory 237 is coupled to the bus 220 for communication with the other components via signal line 224.

The communication unit 239 transmits and receives data to and from at least one of the sender device 115 and the media server 101 depending upon where the media application 103 may be stored. In some embodiments, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the sender device 115 or the media server 101, depending on where the media application 103 may be stored. In some embodiments, the communication unit 239 includes a wireless transceiver for exchanging data with the sender device 115, media server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some embodiments, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some embodiments, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The display 241 may include hardware operable to display graphical data received from the media application 103. For example, the display 241 may render graphics to display a user interface that the sender may select in order to start recording sender media. The display 241 is coupled to the bus 220 for communication with the other components via signal line 228.

The microphone 243 may include hardware operable to detect and record audio received from the sender. For example, the microphone 243 may record sender media where the sender media is an audio recording or a video recording that includes an audio component. The microphone 243 is coupled to the bus 220 for communication with the other components via signal line 230.

The camera 245 may include hardware operable to capture images of the sender. For example, the camera 245 may capture one or more images or video in conjunction with the microphone 243 that are used to generate the sender media. The camera 245 is coupled to the bus 220 for communication with other components via signal line 232.

The speaker 247 may include hardware operable to play audio. For example, the speaker 247 may play combined media that includes at least a portion of the sender media and the recipient media so that the sender may listen to the recipient's answers to the sender's questions. The speaker 247 is coupled to the bus 220 for communication with the other components via signal line 234.

The storage device 249 may be a non-transitory computer-readable storage medium that stores data that provides the functionality described herein. For example, the storage device 249 may store sender media recorded by the sender. In embodiments where one or more operations are performed by the media server 101, the storage device 249 may include the database 199 in FIG. 1. The storage device 249 may be a DRAM device, a SRAM device, flash memory or some other memory device. In some embodiments, the storage device 249 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The storage device 249 is coupled to the bus 220 for communication with the other components via signal line 236.

The media application 103b may include a detector 202, an analyzer 204, a machine learning module 206, a media generator module 208, and a user interface module 210.

The detector 202 may detect that sender media is generated by the sender device 115. In some embodiments, the detector 202 includes a set of instructions executable by the processor 235 to detect the sender media. In some embodiments, the detector 202 is stored in the memory 237 of the sender media 115 and can be accessible and executable by the processor 235.

In some embodiments, the detector 202 detects that the sender media is generated by the sender device 115 responsive to the sender instructing the sender device 115 to record an audio or video message. For example, the sender may select an icon on a user interface generated by the user interface module 210 for starting to record the sender media. In another example, where the sender is using a browser-based application, the detector 202 may receive an indication that the sender is recording the sender media from the microphone 243, the camera 245, or the storage device 249.

In some embodiments, the detector 202 may communicate with the analyzer 204 to perform analysis on the sender media, the machine learning module 206 to modify the sender media, the media generator module 208 to prepare the sender media for routing to the media server 101 or the recipient device 117, and/or the user interface module 210 for making changes via a user interface.

The analyzer 204 may analyze the sender media. In some embodiments, the analyzer 204 includes a set of instructions executable by the processor 235 to analyze the sender media. In some embodiments, the analyzer 204 is stored in the memory 237 of the sender device 115 and can be accessible and executable by the processor 235.

The analyzer 204 may analyze the sender media by determining breaks in the sender media. The breaks may take the form of a pause between the sender's words or sentences, or a semantic break. The analyzer 204 may use the pause to identify locations where the sender has a question for the recipient. For example, if the sender media is a lecture on the citric acid cycle (aka the Krebs cycle), the sender may pause after introducing new concepts during the lecture. These may be locations in the sender media where the recipient might have a clarifying question. In another example, where the sender media is about making plans to go to a concert on Saturday night, the sender may pause right after asking the question "Are you free to see Band X on Saturday night?" In some embodiments, the analyzer 204 may communicate with the machine learning module 206 to identify pauses that should be extended or even identify locations where there should be a pause to emphasize to the recipient that this is a location where the recipient should provide a response.

The analyzer 204 may use semantic analysis to identify a semantic break in the sender media. For example, the analyzer 204 may identify a semantic break based on words that typically end sentences, an inflection in the sender's voice that may indicate a question, etc. In some embodiments, the analyzer 204 may also identify portions of the sender media where the sender is asking a rhetorical question that does not need an answer. For example, many messages start off with "Hey, how are you?" but the sender is not actually looking for a response. In some embodiments, the analyzer 204 may communication with the machine learning module 206 to perform semantic analysis to identify semantic breaks in the sender media.

In some embodiments, the analyzer 204 may also perform speech recognition of the sender media. For example, the analyzer 204 may send the sender media to a second server 120, which performs transcription of the audio or video.

In some embodiments, the analyzer 204 uses the analysis of the sender media to generate a summary of the sender media. For example, the analyzer 204 may use the analysis to determine a context of the sender media that is used to create a summary for combined media. This is discussed in greater detail below with reference to FIG. 3.

In some embodiments, the machine learning module 206 is stored in the memory 237 of the sender device 115 and can be accessible and executable by the processor 235. In some embodiments, the machine learning module 206 may be a separate application that is stored on a separate server.

In some embodiments, the machine learning module 206 is a model that has been trained to analyze audio to detect questions in the audio to determine the context of the sender media. The machine learning module 206 may also be trained to identify breaks that include pauses or semantic breaks in the sender media. The machine learning module 206 may also perform semantic analysis of a transcribed text version of the sender media to identify questions in the sender media. Examples of different training models are described in greater detail below.

In some embodiments, the machine learning module 206 may implement machine learning techniques that can analyze the sender media, for example, by detecting a pause in the sender media, detecting a semantic break in the media, detecting a question in the sender media, determining a context of the sender media, or determining where to add a pause in the sender media. In some implementations, the model may be trained using synthetic data, e.g., data that is automatically generated by a computer, with no use of user information. In some implementations, user speech data may be obtained, e.g., from volunteers and other consenting users, for the purposes of training the machine learning model. In some implementations, user interaction with media application 103 may be utilized to update the machine learning model, e.g., if user feedback indicates that the model misclassified a portion of the media.

In some embodiments, trained models may be trained, e.g., based on training data, for which permissions to utilize user data for training have been obtained expressly from users. The training data may include any data, such as media and corresponding metadata, that is permitted for use for training, such as synthetic or computer-generated data, data licensed for use for training, etc. The training data may include media where pauses, semantic breaks, and/or questions were detected and identified or a transcribed version of media. The media may be generated internally, such as those stored on the database 199 of the media server 101 or from media received from the second server 120. For example, the second server 120 may be a media server that provides media with metadata that indicates locations of pauses, semantic breaks, and/or questions.

In some embodiments, a trained model may be obtained based on supervised learning, for example, based on training data that media and classifications for each portion of the media (e.g., "pause," "semantic break," "question," etc.). For example, a trained model may include a model form or structure (e.g., descriptive of a number and organization of a plurality of neural network nodes into layers of a neural network, with associated weights). In some embodiments, a trained model may be trained such that the machine learning module 206 applies the trained model to perform analysis of the sender media.

In some embodiments, users may provide the training data by providing user input. Users may be asked to identify the location of pauses, semantic breaks, and/or questions in media or a transcribed version of the media. As a result of the user input, the training data may have accurate identification of pauses, semantic breaks, and/or questions in the media.

In various implementations, the machine learning module 206 may utilize Bayesian classifiers, support vector machines, neural networks, or other learning techniques. In some implementations, the machine learning module 206 may include a trained model, an inference engine, and data. The machine learning module 206 may use different trained models for different types of data. For example, the machine learning module 206 may apply different models to different languages or users located in different geographical regions (e.g., different locales).

In some implementations, data may include training data, e.g., data used to generate a trained model. For example, training data may include any type of data such as text, images, audio, video, etc. Training data may be obtained from any source, e.g., a data repository specifically marked for training, data for which permission is provided for use as training data for machine learning, etc. In implementations where one or more users permit use of their respective user data to train a machine learning model, e.g., a trained model, training data may include such user data. In implementations where users permit use of their respective user data, data may include permitted data such media e.g., photos or other user-generated images, video, audio, text, etc.

The machine learning module 206 also includes a trained model. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers.

For example, nodes of a first layer (e.g., input layer) may receive data as input data or application data. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In different implementations, the trained model can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a non-linear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data, to produce a result.

For example, training may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to differentiate images such that the model distinguishes abstract images (e.g., synthetic images, human-drawn images, etc.) from natural images (e.g., photos).

In another example, a model trained using unsupervised learning may cluster words based on the use of the words in input sentences. In some implementations, unsupervised learning may be used to produce knowledge representations, e.g., that may be used by machine learning module 206. In various implementations, a trained model includes a set of weights, or embeddings, corresponding to the model structure. In implementations where data is omitted, machine learning module 206 may include trained model that is based on prior training, e.g., by a developer of the machine learning module 206, by a third-party, etc. In some implementations, trained model may include a set of weights that are fixed, e.g., downloaded from a server that provides the weights.

Machine learning module 206 also includes an inference engine. An inference engine is configured to apply the trained model to data, such as application data, to provide an inference. In some implementations, inference engine may include software code to be executed by the processor 235. In some implementations, inference engine may specify circuit configuration (e.g., for a programmable processor, for a field programmable gate array (FPGA), etc.) enabling the processor 235 to apply the trained model. In some implementations, inference engine may include software instructions, hardware instructions, or a combination. In some implementations, the inference engine may offer an application programming interface (API) that can be used by an operating system and/or other applications to invoke inference engine, e.g., to apply trained model to application data to generate an inference.

The machine learning module 206 may provide several technical advantages. For example, when the trained model is generated based on unsupervised learning, the trained model can be applied by the inference engine to produce knowledge representations (e.g., numeric representations) from input data, e.g., application data. For example, a model trained for image analysis may produce representations of images that have a smaller data size (e.g., 1 KB) than input images (e.g., 10 MB). In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of inference engine. In some implementations, knowledge representations generated by the machine learning module 206 may be provided to a different device that conducts further processing, e.g., over a network. In such implementations, providing the knowledge representations rather than the images may provide a technical benefit, e.g., enable faster data transmission with reduced cost. In another example, a model trained for clustering documents may produce document clusters from input documents. The document clusters may be suitable for further processing (e.g., determining whether a document is related to a topic, determining a classification category for the document, etc.) without the need to access the original document, and therefore, save computational cost.

In some implementations, the machine learning module 206 may be implemented in an offline manner. In these implementations, trained model may be generated in a first stage, and provided as part of the machine learning module 206. In some implementations, the machine learning module 206 may be implemented in an online manner. For example, in such implementations, an application that invokes the machine learning module 206 (e.g., an operating system or one or more of other applications) may utilize an inference produced by the machine learning module 206, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model, e.g., to update embeddings for trained model.

In some implementations, the machine learning module 206 may be implemented in a manner that can adapt to particular configuration of the sender device 115 on which the machine learning module 206 is executed. For example, the machine learning module 206 may determine a computational graph that utilizes available computational resources, e.g., the processor 235. For example, if the machine learning module 206 is implemented as a distributed application on multiple devices, the machine learning module 206 may determine computations to be carried out on individual devices in a manner that optimizes computation. In another example, the machine learning module 206 may determine that the processor 235 includes a GPU with a particular number of GPU cores (e.g., 1000) and implement the inference engine accordingly (e.g., as 1000 individual processes or threads).

In some implementations, the machine learning module 206 may implement an ensemble of trained models. For example, trained model may include a plurality of trained models that are each applicable to same input data. In these implementations, machine learning module 206 may choose a particular trained model, e.g., based on available computational resources, success rate with prior inferences, etc. In some implementations, the machine learning module 206 may execute the inference engine such that a plurality of trained models is applied. In these implementations, the machine learning module 206 may combine outputs from applying individual models, e.g., using a voting-technique that scores individual outputs from applying each trained model, or by choosing one or more particular outputs. Further, in these implementations, the machine learning module 206 may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by an operating system or one or more applications.

In different implementations, the machine learning module 206 can produce different types of outputs. For example, the machine learning module 206 can provide representations or clusters (e.g., numeric representations of input data), labels (e.g., for input data that includes images, documents, etc.), phrases or sentences (e.g., descriptive of an image or video, suitable for use as a response to an input sentence, etc.), images (e.g., generated by the machine-learning application in response to input), audio or video. In some implementations, the machine learning module 206 may produce an output based on a format specified by an invoking application, e.g. the operating system or one or more applications. In some implementations, an invoking application may be another machine-learning application. For example, such configurations may be used in generative adversarial networks, where an invoking machine learning module is trained using output from machine learning module 206 and vice-versa.

The media generator module 208 may finalize the sender media. In some embodiments, the media generator module 208 includes a set of instructions executable by the processor 235 to finalize the sender media. In some embodiments, the media generator module 208 is stored in the memory 237 of the sender device 115 and can be accessible and executable by the processor 235.

The media generator module 208 may receive the sender media from the detector 202 or the storage device 249 and an identification of locations of pauses and semantic breaks from the analyzer 204 or the machine learning module 206. In some embodiments, the media generator module 208 modifies the sender media in one or more places where pauses and breaks have been identified to include space, such as one or two-second pauses. The space may make it easier for the recipient to identify the locations where the sender is looking for a recipient to respond to a question in the sender media. The media generator module 208 may send the modified sender media directly to the recipient device 117 or via the media server 101.

In some embodiments, where the sender media is an audio recording, the media generator module 208 generates a video from the audio recording that includes one or more images. For example, the media generator module 208 uses images of the sender, such as a profile image of the sender, images on the sender device 115 of the sender, etc. to add to the audio recording. The media generator module 208 may use a single image in conjunction with the audio recording or a slideshow of images.

In some embodiments, the media generator module 208 may identify a topic of the audio recording, obtain images that correspond to the topic, and generate a video that includes the images. For example, if the sender media is about a concert and eating dinner at a particular restaurant before the show, the media generator module 208 may generate a video that includes images of the sender, the band playing at the concert, and the restaurant mentioned in the audio recording.

The user interface module 210 generates graphical data for displaying a user interface. In some embodiments, the user interface module 210 includes a set of instructions executable by the processor 235 to generate the graphical data. In some embodiments, the user interface module 210 is stored in the memory 237 of the sender device 115 and can be accessible and executable by the processor 235.

In some embodiments, the user interface module 210 generates graphical data for displaying a user interface for the sender to initiate an audio or video recording. For example, the user interface module 210 may include an option for calling a recipient and, if the recipient does not answer, generating sender media. Alternatively, or additionally, the user interface may include an option for generating sender media without first calling.

In some embodiments, the user interface module 210 may include a user interface that includes an option for playing the combined media. In some embodiments, the user interface may include a seek bar that includes information about the combined media, such as a location where a sender asked a question and the location where the recipient answered the question. The seek bar user interface is described in greater detail below with reference to FIGS. 4A and 4B.

The user interface module 210 may generate a user interface with additional options, such as system options for creating a profile, user preferences, etc. The user preferences may include an option for adding space after pauses or semantic breaks in the sender media.

Example Recipient Device

Figure 3:
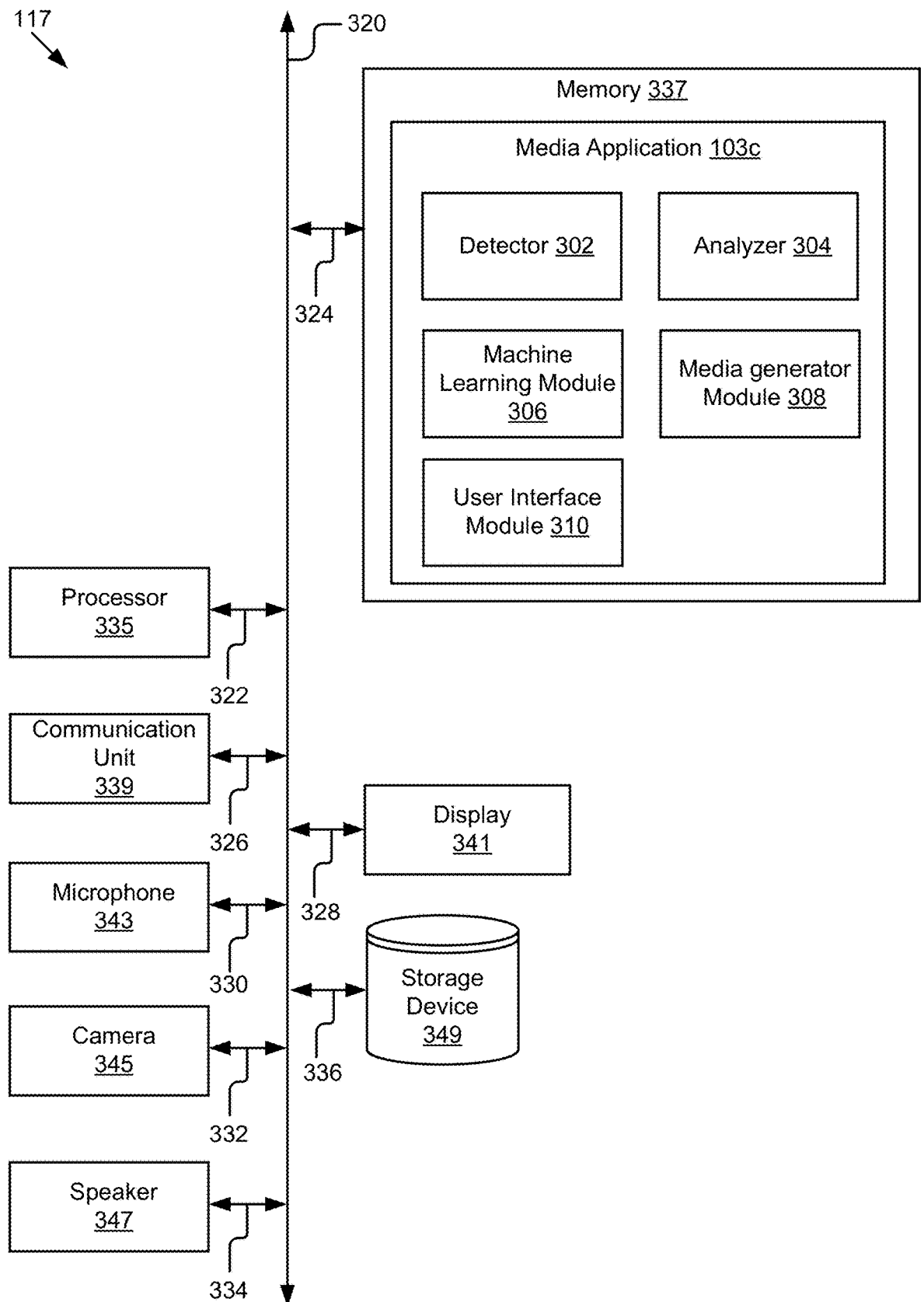
FIG. 3 illustrates a block diagram of an example recipient device that generates recipient media according to some embodiments.

FIG. 3 illustrates a block diagram of an example recipient device 117 that generates recipient media according to some embodiments. Although FIG. 3 is illustrated as being a recipient device 115, some or all of the functions may be performed by the media server 101. The recipient device 117 may include a processor 335, a memory 337, a communication unit 339, a display 341, a microphone 343, a camera 345, a speaker 347, and a storage device 349. Because FIG. 2 described processor 235, a memory 237, a communication unit 239, a display 241, a microphone 243, a camera 245, a speaker 247, and a storage device 249, their descriptions are not repeated here. Additional components may be present or some of the previous components may be omitted depending on whether the steps are performed by the recipient device 115 or the media server 101. The processor 335 is coupled to the bus 320 via signal line 322, the communication unit 339 is coupled to the bus 320 via signal line 326, the display 341 is coupled to the bus 320 via signal line 328, the microphone 343 is coupled to the bus 320 via signal line 330, the camera 345 is coupled to the bus 320 via signal line 332, the speaker 347 is coupled to the bus 320 via signal line 334, and the storage device 349 is coupled to the bus 320 via signal line 336.

The microphone 343 may include hardware operable to detect and record audio received from the sender. For example, the microphone 343 may record recipient media where the recipient media is an audio recording or a video recording that includes an audio component. In some embodiments, the microphone 343 may detect audio from the recipient and send a notification of the detection to the detector 302. The microphone 343 may also record any audio spoken by the recipient.

The camera 345 may include hardware operable to capture images of the recipient. For example, the camera 345 may capture one or more images or video in conjunction with the microphone 343 that are used to generate the recipient media.

The speaker 347 may include hardware operable to play audio and pause audio responsive to receiving an instruction from the detector 302. For example, the microphone 343 plays sender media, the recipient starts talking, the detector 302 instructs the speaker 347 to stop playing the sender media, and the microphone 343 records the recipient media.

The media application 103c may include a detector 302, an analyzer 304, a machine learning module 306, a media generator module 308, and a user interface module 310. The operations described above with reference to the detector 202, the analyzer 204, the machine learning module 206, the media generator module 208, and the user interface module 210 may also apply to the components of the media application 103c, and so, will not be discussed again here. The media application 103c is coupled to the bus 320 via signal line 324.

The detector 302 may detect whether the recipient is speaking during playback of sender media. In some embodiments, the detector 302 includes a set of instructions executable by the processor 335 to detect speech. In some embodiments, the detector 302 is stored in the memory 337 of the recipient device 117 and can be accessible and executable by the processor 335.

In some embodiments, the detector 302 receives a notification from the microphone 343 when the microphone 343 detects the recipient speaking during playback of the sender media. The detector 302 may instruct the speaker 347 to pause the playback of the sender media and instruct the microphone 343 to record the recipient media. In some embodiments, the microphone 343 may automatically record recipient media responsive to detecting that the recipient is speaking during playback of the sender media. Once the recipient stops speaking, the detector 302 may instruct the speaker 347 to start playing the sender media until the recipient begins speaking again.

In some embodiments, the detector 302 detects a start point of a speech signal from the recipient speaking with the microphone 343. For example, the detector 302 may use a speech endpointer to detect a start point of a speech event. Once the recipient stops speaking, the detector 302 may use the speech endpointer to detect an endpoint of the speech event. The detector 302 may then instruct the speaker 347 to start playing the sender media until the recipient begins speaking again.

In some embodiments, the detector 302 uses multiple types of input signals to detect a start point and/or an endpoint of the speech signal. The detector 302 may use a combination of audio inputs and video inputs. For example, the detector 302 may identify a start point of a speech signal in a video based on a sender's mouth opening, because it implies the beginning of speech. The detector 302 may use a scoring system to determine a likelihood of a start point or an endpoint for the speech signal based on a combination of audio inputs and video inputs. For example, the detector 302 may determine an 80% likelihood that a point in time is the start point of the sender speaking based on audio of the sender speaking and video of the sender's mouth moving.

Because there may be some overlap between the sender media playing and the recipient media being recorded, the microphone 343 that is recording recipient media may inadvertently pick up some of the sender media as it is being played back. As a result, in some embodiments the detector 302 may use echo cancellation (e.g., an echo cancellation algorithm or echo cancellation hardware) to prevent the sender media from feeding back into the microphone 343.

The analyzer 304 may analyze the sender media and/or the recipient media. In some embodiments, the analyzer 304 includes a set of instructions executable by the processor 335 to analyze the sender media and/or the recipient media. In some embodiments, the analyzer 304 is stored in the memory 337 of the recipient device 117 and can be accessible and executable by the processor 335.

In some embodiments, the analyzer 304 performs the steps described above for analyzing the sender media. For example, the analyzer 304 may identify the locations of questions, pauses, and semantic breaks in the sender media. In other embodiments, the analyzer 304 receives the identification of the locations of questions, pauses, and semantic breaks in the sender media from the sender device 115 or the media server 101.

The analyzer 304 may determine a context of the sender media in relation to the recipient media that includes a question being asked by the sender at the location in the sender media at which the recipient media is to be included and a subset of the sender media that is within proximity to the question. The subset of the sender media may be determined based on a fixed amount of time before or after the question (for example, five seconds of the sender media) or the subset may be based on the locations of a pause or a semantic break. For example, the analyzer 304 may identify the context as including the question "Where do you want to go for our next date?" and identify the subset as a sentence or two before or after the question, such as "I picked the restaurant for our last date, so you should choose this time." The analyzer 304 may summarize the sender media based on the context by instructing the media generating module 308 to generate combined media that includes the context along with the recipient media that states "Vegan Burger Deluxe!"

In some embodiments, the analyzer 304 may include a summary of the sender media and/or the recipient media. For example, the analyzer 304 may obtain or receive a transcription of the sender media and/or the recipient media and provide the transcription along with the combined media. In some embodiments, the analyzer 304 may include a summary that only includes the context of the sender media in relation to the recipient media.

In some embodiments, the machine learning module 306 is stored in the memory 337 of the recipient device 117 and can be accessible and executable by the processor 335.

In some embodiments, the machine learning module 306 uses machine learning to refine the detection of the endpoints on speech. For example, the machine learning module 306 may be trained on near-field speech samples to identify a start point of a speech event and an endpoint of a speech event.

The media generator module 308 may generate combined media from the sender media and the recipient media. In some embodiments, the media generator module 308 includes a set of instructions executable by the processor 335 to finalize the sender media. In some embodiments, the media generator module 308 is stored in the memory 337 of the recipient device 117 and can be accessible and executable by the processor 335.

The media generator module 308 may generate combined media that includes the sender media and the recipient media at a location in the sender media at which the recipient media is to be included. For example, the recipient media may be inserted directly after a question in the sender media that was identified as a location by the analyzer 204 of the sender device 115 or the analyzer 304 of the recipient device 117. If the sender media includes a number of questions and the recipient media includes a number of answers, the combined media may include a first question from the sender media followed by a first answer from the recipient media, a second question from the sender media followed by a second answer from the recipient media, etc. In embodiments where the analyzer 204 or the machine learning module 206 added a pause after a question in the sender media, the media generator module 308 may add the recipient media to start after the pause.

In some embodiments, the media generator module 308 may combine a portion of the sender media with the recipient media. For example, the media generator module 308 may receive a summary of the sender media based on a context from the analyzer 304 and combine the summary with the recipient media. For example, instead of including an entire sender media from a father that goes through all the events of his past week, the sender media may include the portion of the sender media that includes a question about when the recipient is going to visit next.

In some embodiments, the sender media is summarized based on the context of the text transcription. Instead of combined media that includes a sender video and a recipient video, the combined media may include a text transcription of the question from the sender followed by the recipient media. For example, the sender media question may be "Did you want to get coffee? How about tomorrow at 6 pm?" and the recipient media may be "Sure. 6 pm sounds good." The media generator module 308 may generate combined media that includes a visual display of the word "Coffee?" audio of the recipient stating "Sure," a visual display of "Tomorrow 6 pm?" and audio of the recipient stating "6 pm sounds good."

In some embodiments, the media generator module 308 may generate combined media from sender media and recipient media from multiple recipients. For example, the media generator module 308 may be stored on the media server 101 and may receive the sender media from the sender device 115 and recipient media from a set of recipient devices 117. The media generator module 308 may generate the combined media with the sender media asking a question, and answers from multiple recipients that are organized based on timestamps associated with the recipient media. For example, the sender and the recipients may be part of a group that are having a discussion about a camping trip. The sender may ask if people would prefer Yosemite or Grand Tetons and the combined media may include the sender's question along with the answer of all the recipients. In another example, the sender may be a professor giving a lecture and the recipient media may include comments and clarifying questions about the lecture.

The user interface module 310 generates graphical data for displaying a user interface. In some embodiments, the user interface module 310 includes a set of instructions executable by the processor 335 to generate the graphical data. In some embodiments, the user interface module 310 is stored in the memory 337 of the recipient device 117 and can be accessible and executable by the processor 335.

The user interface module 310 may generate a user interface for playing combined media. The combined media may include a video, audio, audio that is paired with images, etc. The user interface may also include a seek bar that visually summarizes the combined media and facilitates selection of different playback locations within the combined media and an identifier that identifies the location of the recipient media in the combined media. For example, the seek bar may use bookmarks, colors, or shading to identify different parts in the combined video, for example, where the sender asked a question and the recipient responded. The seek bar may be a horizontal bar, a vertical bar, a circle, etc. In some embodiments, the seek bar may receive user input for providing playback at different points in the combined video. For example, a user may select any location on the seek bar, such as at an identified question location, to initiate playback of the combined media at the selected location.

Figure 4A:
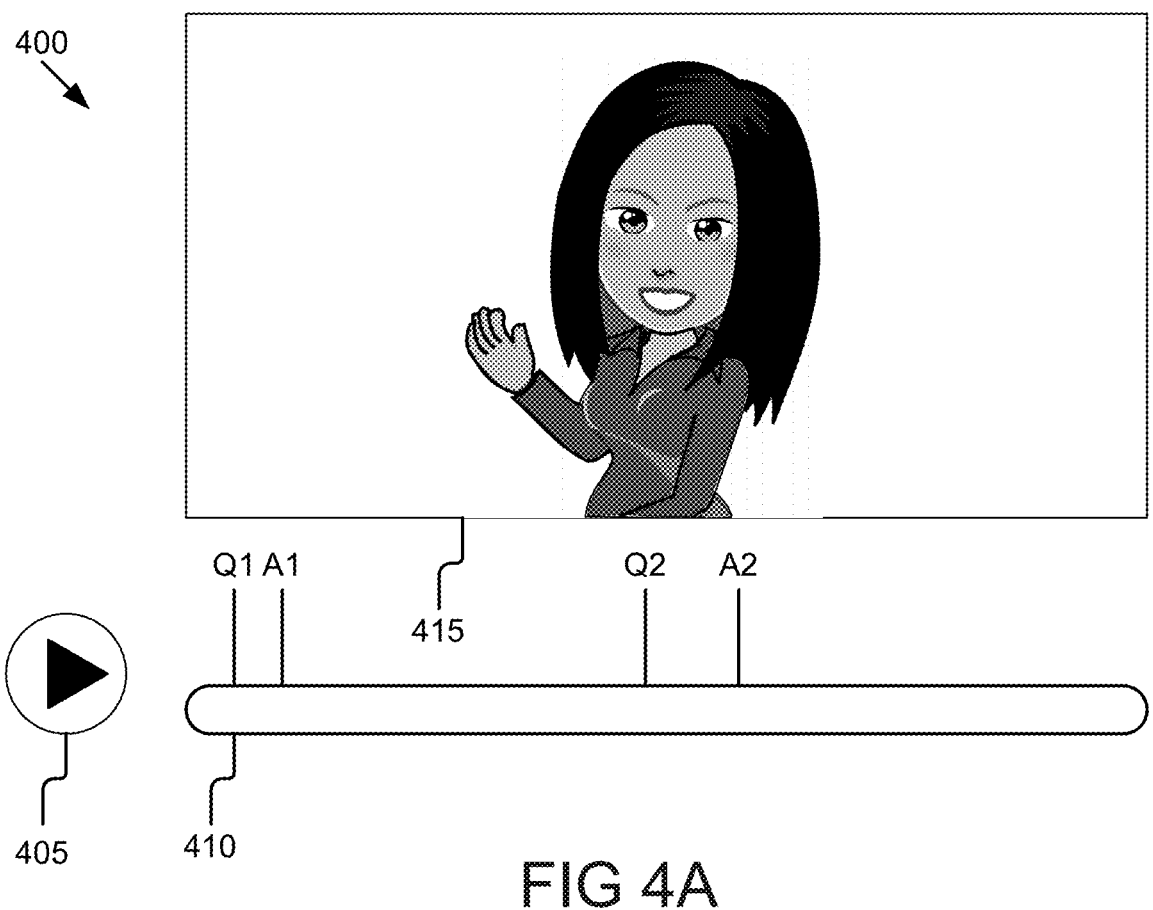
FIGS. 4A and 4B illustrate examples of different seek bars according to some embodiments.

Turning now to FIG. 4A, an example user interface 400 that includes a seek bar 410 is illustrated according to some embodiments. The user interface module 310 may generate a user interface 400 that includes a play button 405, the seek bar 410, and the combined video 415. In some embodiments, pressing the play button 405 may start playback of the combined media 415. The seek bar 410 may include an identification of questions posed by the sender and answers provided by the recipient. In this example, the sender asked two questions and the recipient provided two answers.

Figure 4B:
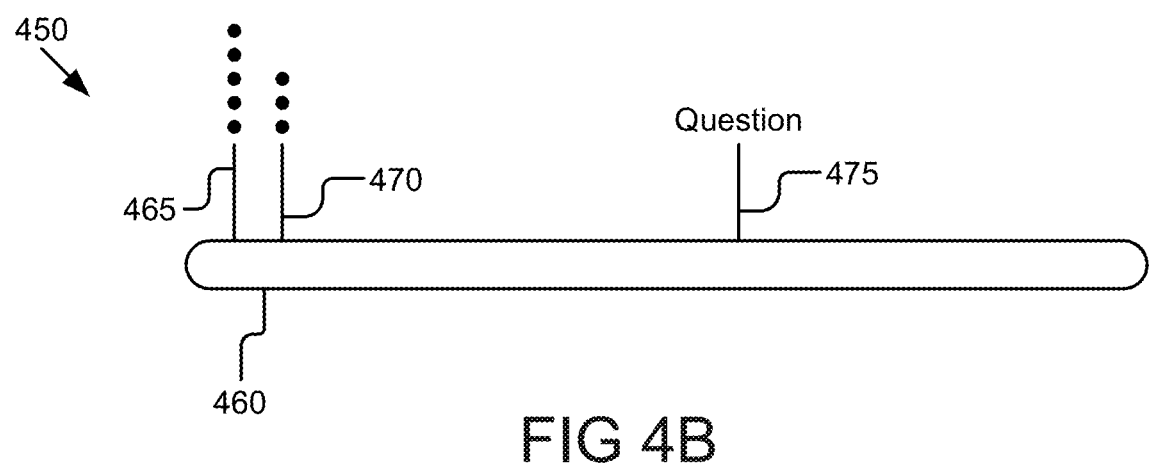

Turning now to FIG. 4B, an example user interface 450 that includes a seek bar 460 is illustrated according to some embodiments. In this example, the combined media is audio and does not include video. As a result, there is no video component as is illustrated in FIG. 4A. The seek bar 460 may illustrate all instances where the combined media includes recipient media. For example, indicator 465 illustrates that five recipients provided recipient media at that location and indicator 470 illustrates that three recipients provided recipient media at that location. In some embodiments, if the recipient media at a particular location exceeds a threshold value, the user interface module 310 identifies the location as a question. In this example, indicator 475 is identified as being a question because the set of recipient media included 10 recipients.

Example Methods

Figure 5:
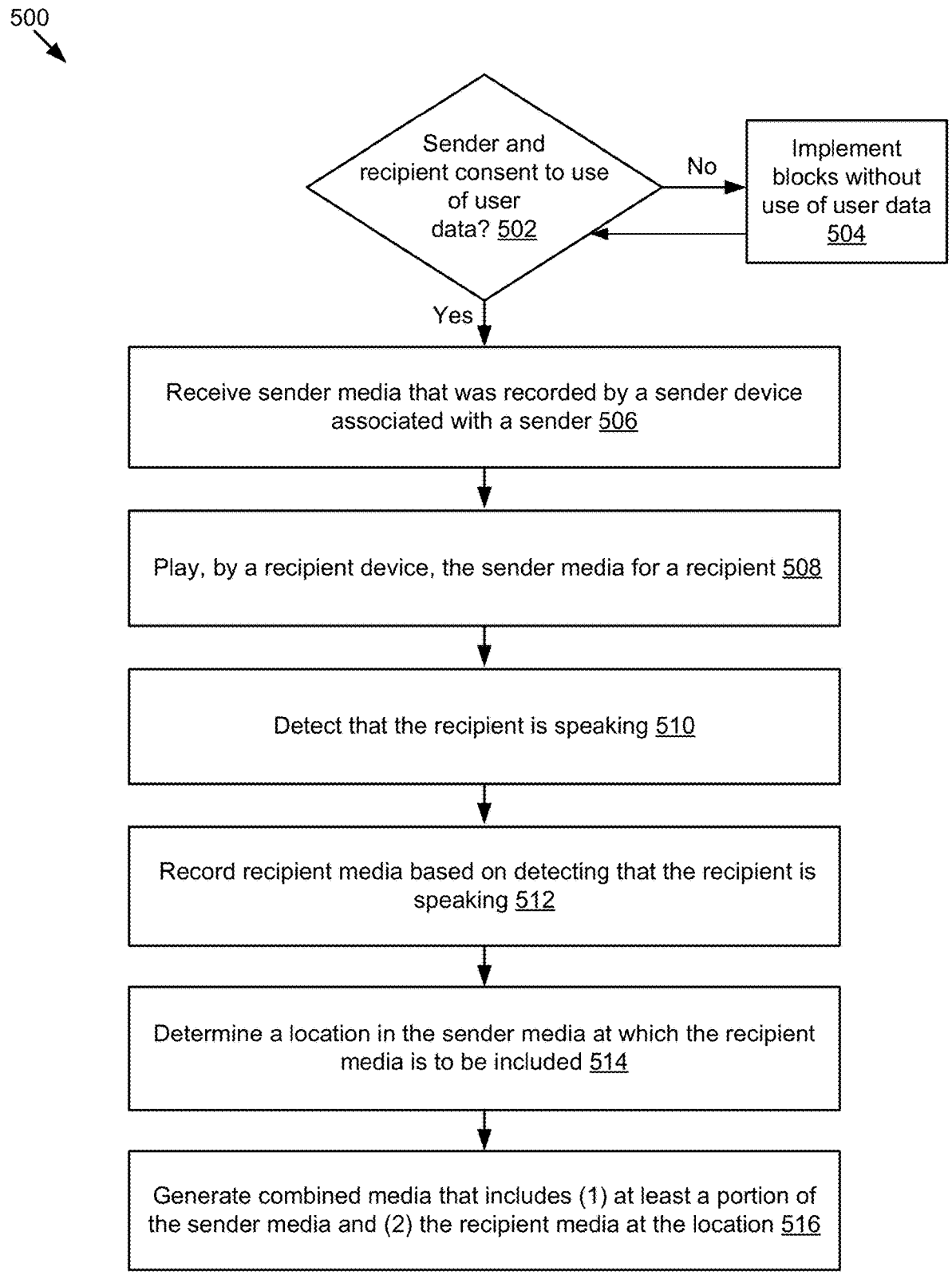
FIG. 5 illustrates a flowchart of an example method to generate combined media according to some embodiments.

FIG. 5 illustrates a flowchart of an example method 500 to generate combined media according to some embodiments. The method 500 is performed by any combination of a media application 103*a* stored on a media server 101 and a media application 103*c* stored on a recipient device 117 of FIG. 1.

At block 502, it is determined whether a sender and a recipient consent to the use of user data. If either the sender or the recipient do not consent to use of the user data, at block 504, the blocks are implemented without use of the user data and the method 500 loops back to 502. In some embodiments, the method 500 stops because the sender media and the recipient media are considered user data and the method 500 could not proceed without either of these pieces.

If the sender at the recipient consent to the use of user data, at block 506, sender media is received that was recorded by a sender device associated with a sender. At block 508, a recipient device plays the sender media for a recipient. At block 510, it is detected that the recipient is speaking. In some embodiments, the media application 103 pauses playback of the sender media while the recipient is speaking. At block 512, recipient media is recorded based on detecting that the recipient is speaking. At block 514, a location is determined in the sender media at which the recipient media is to be included. For example, the media application 103 may determine that the recipient media is to be added directly after a question asked in the sender media. At block 516, combined media is generated that includes (1) at least a portion of the sender media and (2) the recipient media at the location.

Figure 6:
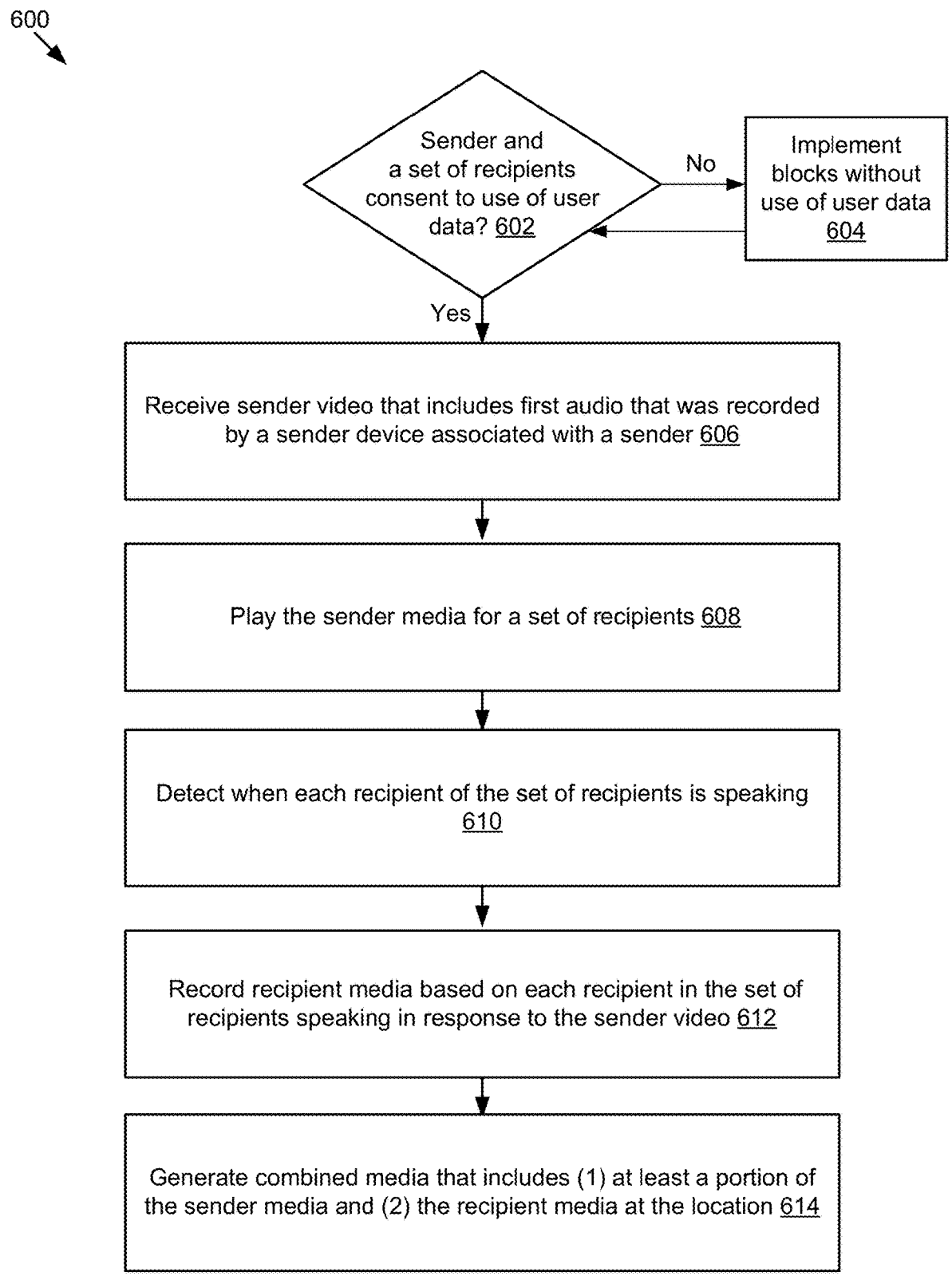
FIG. 6 illustrates a flowchart of another example method to determine combined media.

FIG. 6 illustrates a flowchart of another example method 600 to generate combined media according to some embodiments. The method 600 is performed by any combination of a media application 103*a* stored on a media server 101 and a media application 103*c* stored on a recipient device 117 of FIG. 1.

At block 602, it is determined whether a sender and a set of recipients consent to the use of user data. If either the sender or the recipient do not consent to use of the user data, at block 604, the blocks are implemented without use of the user data and the method 600 loops back to 602. In some embodiments, the method 600 stops because the sender media and the recipient media are considered user data and the method 600 could not proceed without either of these pieces. In some embodiments, if the sender and at least one recipient from the set of recipients consents to the use of user data, the method 600 proceeds without using recipient media from the non-consenting recipients.

If the sender at the recipient consent to the use of user data, at block 606, sender video is received that includes first audio that was recorded by a sender device associated with a sender. For example, the sender video could be a continuing educational video. At block 608, the sender media is played for a set of recipients. For example, each recipient listens to the sender media on a separate recipient device. At block 610, it is detected when each recipient of the set of recipients is speaking. For example, each recipient device uses endpoints to detect when the recipient is speaking and pauses while the recipient is speaking. Each recipient may be speaking at different times in relation to the sender media. At block 612, recipient media is recorded based on each recipient in the set of recipients speaking in response to the sender video. The recipient device may start the sender media again when each recipient finishes speaking. At block 614, combined media is generated that includes (1) at least a portion of the sender media and (2) the recipient media at the location.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect or use personal information, the systems provide users with an opportunity to control whether programs or features collect user information (e.g., information about a user's social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A method comprising:
   receiving sender media that was recorded by a sender device associated with a sender;
   playing, by a recipient device, the sender media for a recipient;
   detecting that the recipient is speaking;
   recording recipient media based on detecting that the recipient is speaking;
   determining, based on a pause or a semantic break in the sender media, that the sender media includes a question being asked by the sender, wherein a machine learning model trained to detect the pause or the semantic break determines the question by detecting the pause or the semantic break in the sender media;

determining, based on the pause or the semantic break, a location to respond to the question in the sender media at which the recipient media is to be included;

determining a context of the sender media that includes a subset of the sender media that is within temporal proximity to the question;

summarizing the sender media based on the context by reducing the sender media to the subset of the sender media, wherein the subset of the sender media includes the question and additional sentences surrounding the question; and generating combined video media from the subset of the sender media and the recipient media at the location to create a summary.

2. The method of claim 1, wherein the combined video media
includes images of the sender and the recipient.

3. The method of claim 1, further comprising:
performing semantic analysis to identify that a subsequent question in the sender media is a rhetorical question that does not need an answer.

4. The method of claim 1, wherein determining the context of the sender media is performed using the machine learning model that is trained using training data that includes portions that are classified as including one or more of pauses, semantic breaks, or questions, wherein the training data is distinct from the sender media.

5. The method of claim 1, wherein the sender media is summarized based on the context as a text transcription.

6. The method of claim 1, wherein the machine learning model is trained to analyze audio of the sender media to detect questions in the audio.

7. The method of claim 1, wherein the subset of the sender media is generated by adding the pause after the location in the sender media at which the recipient media is to be included and the recipient media starts after the pause.

8. The method of claim 1, wherein detecting that the recipient is speaking comprises detecting a start point of a speech signal with a microphone of the recipient device.

9. The method of claim 1, further comprising:
generating a user interface operable for playback of the combined video media, the user interface including a seek bar that facilitates selection of different playback locations within the combined video media and an identifier that identifies the location of the recipient media in the combined video media.

10. The method of claim 1, wherein the sender media is a video file or an audio file.

11. A system comprising:
one or more processors; and
a memory coupled to the one or more processors, with instructions stored thereon that, when executed by the one or more processors, cause the one or more processors to perform operations comprising:
receiving a sender video that includes first audio that was recorded by a sender device associated with a sender;
playing the sender video for a set of recipients;
detecting when each recipient of the set of recipients is speaking;
recording recipient media based on the set of recipients speaking in response to the sender video;
determining, based on a pause or a semantic break in the sender video, that the sender video includes a question being asked by the sender, wherein a machine learning model trained to detect the pause or the semantic break determines the question by detecting the pause or the semantic break in the sender video;

determining, based on the pause or the semantic break, a location to respond to the question in the sender video at which the recipient media is to be included;

determining a context of the sender video that includes a subset of the sender video that is within temporal proximity to the question;

summarizing the sender video based on the context by reducing the sender video to the subset of the sender video, wherein the subset of the sender video includes the question and additional sentences surrounding the question; and generating a combined video from the subset of the sender video and the recipient media to create a summary.

12. The system of claim 11, wherein the memory has further instructions stored thereon that cause the one or more processors to perform operations comprising:
determining a subject matter associated with portions of the combined video where at least one recipient from the set of recipients spoke; and
generating a user interface that includes a seek bar based on the combined video that illustrates (1) a location within the combined video where the set of recipients responded to the sender; (2) a number of recipients of the set of recipients that spoke at the location; and (3) the subject matter associated with the subset of the sender video.

13. The system of claim 11, wherein the recipient media is audio and the memory has further instructions stored thereon that cause the one or more processors to perform operations comprising:
generating a video from the combined video that includes at least one profile image from one or more profile images of the set of recipients.

14. A non-transitory computer-readable medium with instructions that, when executed by one or more computers, cause the one or more computers to perform operations, the operations comprising:
receiving sender media that was recorded by a sender device associated with a sender;
playing, by a recipient device, the sender media for a recipient;
detecting that the recipient is speaking;
recording recipient media based on detecting that the recipient is speaking;
determining, based on a pause or a semantic break in the sender media, that the sender media includes a question being asked by the sender, wherein a machine learning model trained to detect the pause or the semantic break determines the question by detecting the pause or the semantic break in the sender media;
determining, based on the pause or the semantic break, a location to respond to the question in the sender media at which the recipient media is to be included;
determining a context of the sender media that includes a subset of the sender media that is within temporal proximity to the question;
summarizing the sender media based on the context by reducing the sender media to the subset of the sender media, wherein the subset of the sender media includes the question and additional sentences surrounding the question; and generating combined video media from the subset of the sender media and the recipient media at the location to create a summary.

15. The computer-readable medium of claim 14, wherein the combined video media includes images of the sender and the recipient.

16. The computer-readable medium of claim 14, wherein the operations further comprise:
performing semantic analysis to identify that a subsequent question in the sender media is a rhetorical question that does not need an answer.

17. The computer-readable medium of claim 14, wherein determining the context of the sender media is performed using the machine learning model that is trained using training data that includes portions that are classified as including one or more of pauses, semantic breaks, or questions, wherein the training data is distinct from the sender media.

18. The computer-readable medium of claim 14, wherein the sender media is summarized based on the context as a text transcription.

19. The computer-readable medium of claim 14, wherein the machine learning model is trained to analyze audio of the sender media to detect questions in the audio.

20. The computer-readable medium of claim 14, wherein the subset of the sender media is generated by adding the pause after the location in the sender media at which the recipient media is to be included and the recipient media starts after the pause.

* * * * *